(12) United States Patent
Sakai

(10) Patent No.: US 8,120,712 B2
(45) Date of Patent: Feb. 21, 2012

(54) CHANNEL SELECTION IN A RECEIVER FOR TERRESTRIAL DIGITAL TELEVISION BROADCASTING

(75) Inventor: Yuji Sakai, Kanagawa (JP)

(73) Assignee: Sony Corporation (JP)

( * ) Notice: Subject to any disclaimer, the term of this patent is extended or adjusted under 35 U.S.C. 154(b) by 1271 days.

(21) Appl. No.: 11/823,874

(22) Filed: Jun. 29, 2007

(65) Prior Publication Data

US 2008/0005768 A1    Jan. 3, 2008

(30) Foreign Application Priority Data

Jul. 3, 2006   (JP) ................ P2006-183029

(51) Int. Cl.
    *H04N 5/50*      (2006.01)
    *H04N 5/63*      (2006.01)
    *H04N 7/025*     (2006.01)
    *H04N 7/20*      (2006.01)

(52) U.S. Cl. ............. 348/731; 348/570; 725/38; 725/73

(58) Field of Classification Search ................... 348/731, 348/570, 569, 554, 725; 725/38, 48, 59, 725/73

See application file for complete search history.

(56) References Cited

U.S. PATENT DOCUMENTS

| | | | | |
|---|---|---|---|---|
| 5,600,378 | A | * | 2/1997 | Wasilewski .................. 348/468 |
| 5,734,589 | A | * | 3/1998 | Kostreski et al. ............. 715/716 |
| 6,003,041 | A | * | 12/1999 | Wugofski ............................. 1/1 |
| 2002/0166128 | A1 | | 11/2002 | Ikeda et al. |
| 2004/0158870 | A1 | * | 8/2004 | Paxton et al. ................. 725/115 |

FOREIGN PATENT DOCUMENTS

| | | |
|---|---|---|
| JP | 2002094889 | 3/2002 |
| JP | 2004-336093 A | 11/2004 |
| JP | 2005117324 | 4/2005 |
| JP | 08-237570 A | 9/2006 |
| WO | 2005015900 | 2/2005 |
| WO | 2005083918 | 9/2005 |

OTHER PUBLICATIONS

Digital Video Broadcasting (DVB); Specification for Service Information (SI) in DVB Systems ETSI Standards, European Telecommunications Standards Institute, Sophia-Antip0, FR, No. V1601, Jun. 2004, pp. 1-95.

\* cited by examiner

*Primary Examiner* — Victor Kostak
(74) *Attorney, Agent, or Firm* — Lerner, David, Littenberg, Krumholz & Mentlik, LLP

(57) ABSTRACT

Disclosed is a receiver for terrestrial digital television broadcasting including: a receiving circuit for receiving terrestrial digital television broadcasting to output a video signal and an audio signal of a predetermined channel and an information signal of information related to a channel being received; a data table in the receiving circuit on which channel data for selecting channels of the terrestrial digital television broadcasting is registered; and a control circuit. The control circuit is configured such that: first data for identifying a channel, second data for identifying a broadcast service area and third data for identifying a transport stream are taken out of the information signal to be supplied to the control circuit; if the first data is normally obtained, the receiving circuit selects a channel based on the first data with reference to the data table; and if the first data is not normally obtained, the receiving circuit selects a channel based on the second and the third data with reference to the data table.

6 Claims, 16 Drawing Sheets

FIG.1

| LCN | APPLICATION |
|---|---|
| 000 | UNUSED |
| 001~799 | BROADCAST PROGRAM |
| 800~999 | UNUSED |
| 1000~1023 | RESERVED (FOR FUTURE) |

FIG. 2

| Syntax | bit |
|---|---|
| descriptor length | 8 |
| transport stream id | 16 |
| original network id | 16 |
| service id | 16 |
| linkage type | 8 |
| manufacturer id | 24 |
| version id | 32 |

FIG. 3

| Field name | Field length in displayable Characters | Comments and examples |
|---|---|---|
| Network Name | 24 | "Crystal Palace" |
| Service Provider name | 20 | "BBC" |
| Service Name or Preferred Name | 32 | "BBC 1 North-East"<br>Full name for display on set-up menus |
|  | 8 | "BBC 1"<br>A short version for display on browse and listing display. Shortened from full name by use of escape characters as defined in TR 101 211. |
| Event Name | 40 | "Casualty"<br>Individual broadcasters are free to add an episode title to the title within the space, for example "Brit Girls: Marianne" |
| Short Event Description | 200 | "Out of control. When Mark steps in, he faces his own past and is forced to reveal a secret." Broadcasters must ensure that the text does not overflow the maximum descriptor size. |
| Extended Event Text | 3984 | The extended event text complements the short event description |
| Component Description | 32 | "Casualty: guess the injury game" |

FIG.4

| LCN | CHANNEL NAME | ORIGINAL NETWORK IDENTIFIER | TRANSPORT STREAM IDENTIFIER | CHANNEL DATA |
|---|---|---|---|---|
| 001 | BBC ONE | ○○ | ×× | ○×○ |
| 002 | BBC TWO | △△ | □□ | △□□ |
| 003 | ITV1 | ○× | ×△ | ○×□ |
| ⋮ | | | | |

CHANNEL LIST

FIG.5A

REGISTRATION

| LCN | CHANNEL NAME |
|---|---|
| 001 | BBC ONE |
| 002 | BBC ONE |
| 003 | ITV1 |
| 004 | Channel4 |
| 005 | Five |
| 006 | ITV2 |
| 007 | BBC THREE |
| ... | ... |
| 701 | 701 |
| 702 | 702 |
| 705 | 705 |

BROADCAST SERVICE AREA A

CHANNEL LIST

FIG.5B

ADDITIONAL REGISTRATION

| LCN | CHANNEL NAME |
|---|---|
| 001 | BBC ONE |
| 002 | BBC ONE |
| 003 | ITV1 |
| 004 | Channel4 |
| 005 | Five |
| 006 | ITV2 |
| 007 | BBC THREE |
| ... | ... |
| 701 | 701 |
| 702 | 702 |
| 705 | 705 |
| 001 | BBC ONE |
| 002 | BBC ONE |
| 003 | ITV1 |
| 004 | Channel4 |
| ... | ... |
| 701 | 701 |
| 702 | 702 |
| 705 | 705 |

BROADCAST SERVICE AREA A

BROADCAST SERVICE AREA B

ADDITION

CHANNEL LIST

FIG.6B

BROADCAST SERVICE AREA A

| LCN | CHANNEL NAME |
|---|---|
| 001 | BBC ONE |
| 002 | BBC TWO |
| 003 | ITV1 |
| 004 | Channel4 |
| 005 | Five |
| 006 | ITV2 |
| 007 | BBC THREE |
| 008 | Channel4 Wales |

MAIN MENU (DISPLAY SCREEN)

FIG.6A

SORT

| LCN | CHANNEL NAME |
|---|---|
| 001 | BBC ONE |
| 001 | BBC ONE |
| 002 | BBC TWO |
| 002 | BBC TWO |
| 003 | ITV1 |
| 003 | ITV1 |
| 004 | Channel4 |
| ... | ... |
| 702 | 702 |
| 705 | 705 |
| 705 | 705 |

CHANNEL LIST

FIG. 7A

| 001 | BBC ONE North-East | SUB-MENU |
| --- | --- | --- |
| 002 | BBC ONE Wales | |
| 003 | ITV1 | |
| 004 | Channel4 | |
| 005 | Five | |
| 006 | ITV2 | |
| 007 | BBC THREE | |
| 008 | Channel4 Wales | |

MAIN MENU

FIG. 7B

| | North-East |
| --- | --- |
| 001 | BBC ONE |
| 002 | BBC TWO |
| 003 | ITV1 |
| 004 | Channel4 |
| 005 | Five |
| 006 | ITV2 |
| 007 | BBC THREE |
| 008 | Channel4 Wales |

MAIN MENU

FIG.8A

| LCN | CHANNEL NAME |
|---|---|
| 001 | BBC ONE |
| 001 | BBC ONE |
| 001 | BBC ONE |
| 001 | BBC ONE |
| 002 | BBC ONE |
| 002 | BBC ONE |
| 002 | BBC ONE |
| 003 | ITV1 |

CHANNEL LIST

FIG.8B

BROAD CAST SERVICE AREA A

| | |
|---|---|
| 001 | BBC ONE |
| 002 | BBC TWO |
| 003 | ITV1 |
| 004 | Channel4 |
| 005 | Five |
| 006 | ITV2 |
| 007 | BBC THREE |
| 008 | Channel4 Wales |

MAIN MENU

FIG.8C

| | |
|---|---|
| 001 | BBC ONE 25ch |
| 002 | BBC ONE 31ch |
| 003 | BBC ONE 50ch |
| 004 | BBC ONE 56ch |
| 005 | Five |
| 006 | ITV2 |
| 007 | BBC THREE |
| 008 | Channel4 Wales |

SUB-MENU

MAIN MENU

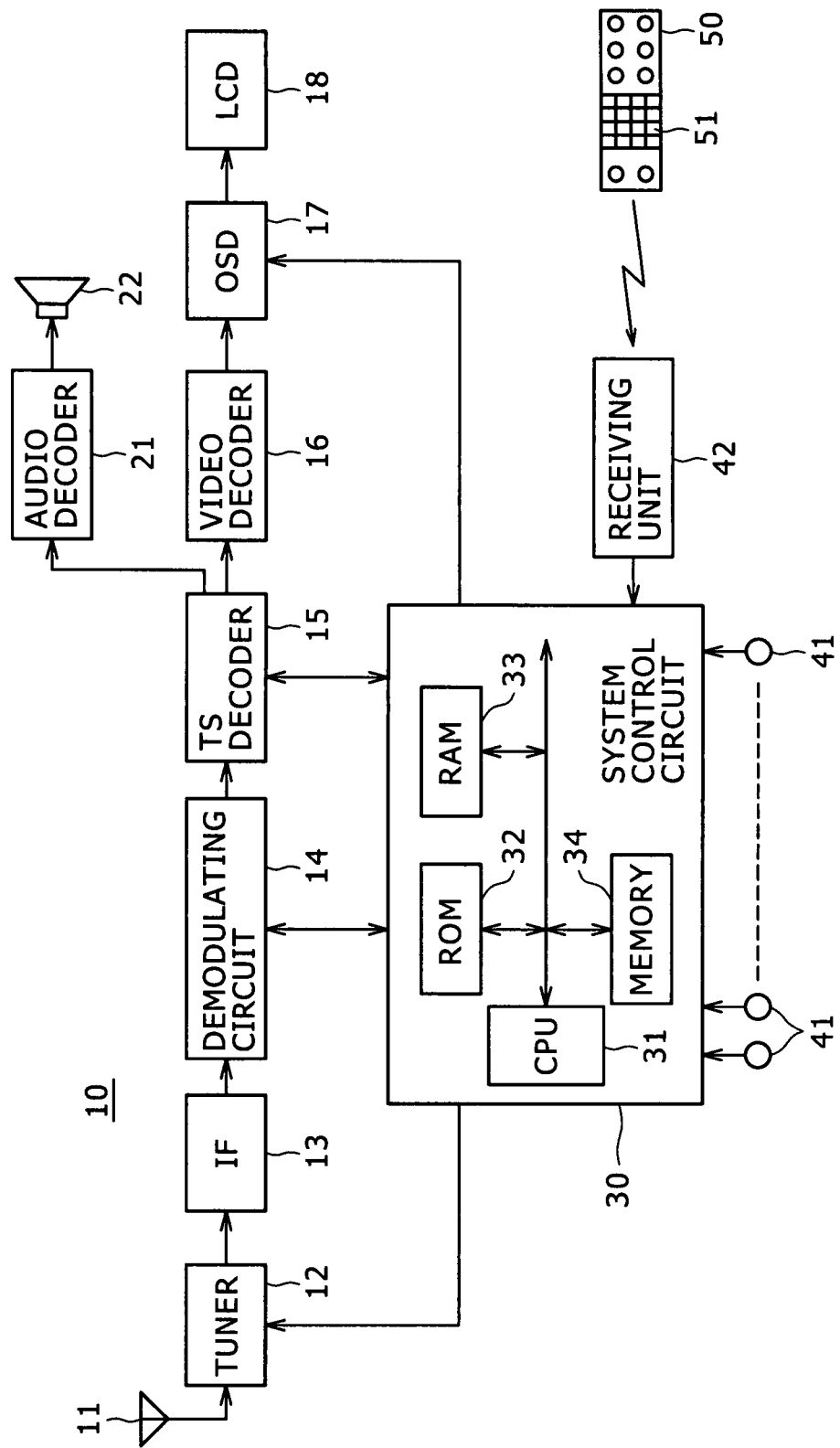

FIG.12

| LCN | CHANNEL NAME | CHANNEL DATA |
|---|---|---|
| 001 | BBC ONE | ○×○ |
| 002 | BBC TWO | △□△ |
|  |  |  |

LCN LIST

FIG.13

| CHANNEL NAME | ORIGINAL NETWORK IDENTIFIER | TRANSPORT STREAM IDENTIFIER | CHANNEL DATA |
|---|---|---|---|
| ○×△<br>×□○<br>△○× | ○○×× <br>○○×× <br>○○×× | ×× <br>×× <br>×× | △○× <br>○×□ <br>×△○ |

IDENTIFIER LIST

FIG.14

| TRANSMISSION CHANNEL | NAMES OF LOGICAL CHANNEL NAME |
|---|---|
| 25ch | BBC ONE |
| | BBC TWO |
| | CBBC Channel |
| | BBC NEWS24 |

FIG.16A

| SERIAL NUMBER | CHANNEL NAME |
|---|---|
| 1 | ITV1 |
| 2 | ITV3 |
| 3 | ITV2 |
| 4 | Channel4 |
| 5 | Bloombreg |
| 6 | ITV NEWS |
| 7 | BBC ONE |
| ... | ... |
| 23 | Sky NEWS |
| 24 | Sky Travel |
| 25 | UKTV Hits |

BROADCAST SERVICE AREA A

FIG.16b

| SERIAL NUMBER | CHANNEL NAME | |
|---|---|---|
| 1 | ITV1 | BROADCAST SERVICE AREA A |
| 2 | ITV3 | |
| 3 | ITV2 | |
| 4 | Channel4 | |
| 5 | Bloombreg | |
| 6 | ITV NEWS | |
| 7 | BBC ONE | |
| ... | ... | |
| 23 | Sky NEWS | |
| 24 | Sky Travel | |
| 25 | UKTV Hits | |
| 26 | ITV1 | BROADCAST SERVICE AREA B (ADDITION) |
| 27 | ITV3 | |
| 28 | ITV2 | |
| 29 | Channel4 | |
| ... | ... | |
| 48 | Sky NEWS | |
| 49 | Sky Travel | |
| 50 | UKTV Hits | |

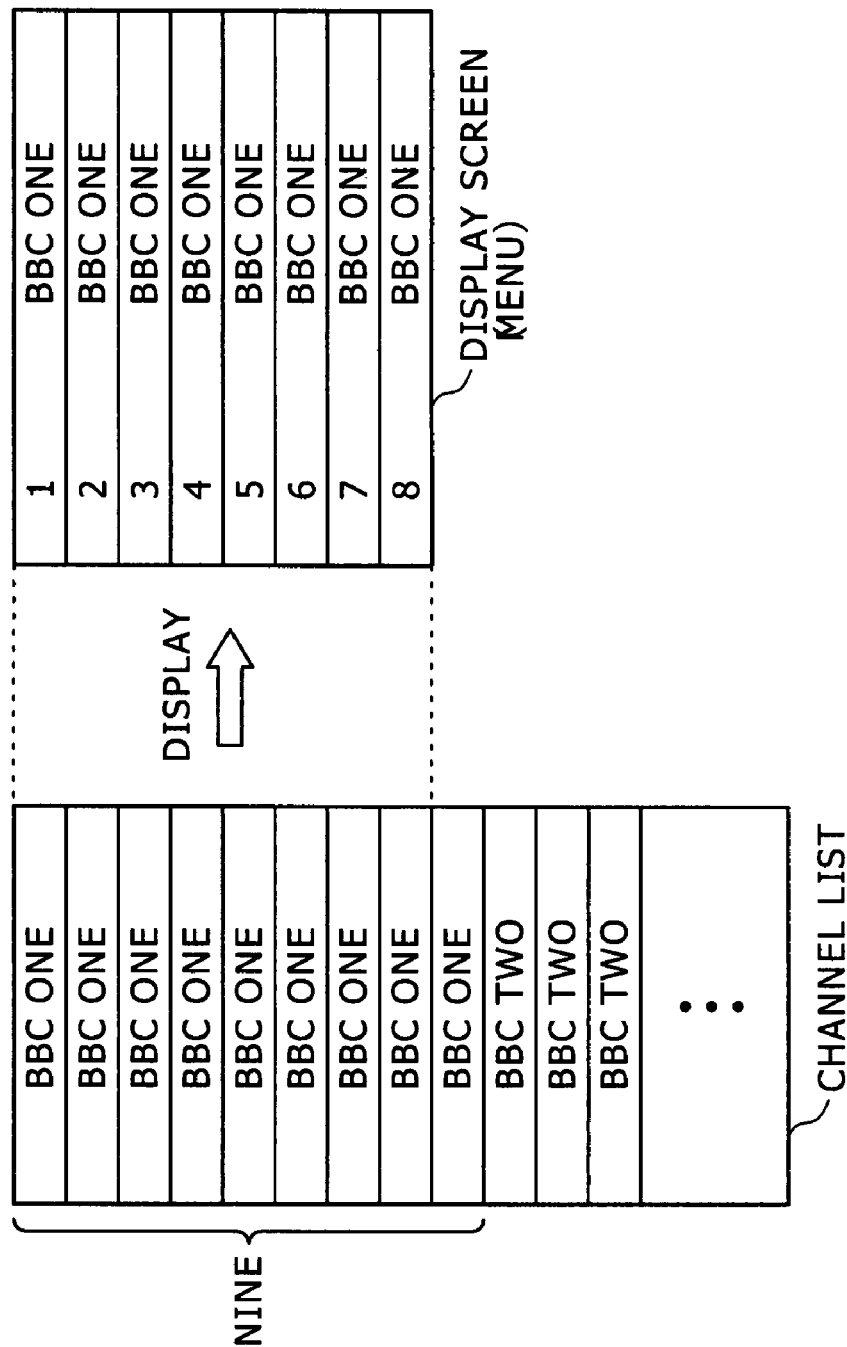

CHANNEL SELECTION IN A RECEIVER FOR TERRESTRIAL DIGITAL TELEVISION BROADCASTING

CROSS REFERENCE TO RELATED APPLICATIONS

The present invention contains subject matter related to Japanese Patent Application JP 2006-183029 filed in the Japanese Patent Office on Jul. 3, 2006, the entire contents of which being incorporated herein by reference.

BACKGROUND OF THE INVENTION

1. Field of the Invention

The present invention relates to a receiver for terrestrial digital television broadcasting.

2. Description of the Related Art

Terrestrial digital television broadcasting uses a multi-frequency network (MFN) to prevent radio waves from interfering between adjacent broadcasting areas. That is to say, adjacent broadcasting areas use transmitting channels (physical channels or transmitting frequencies) different from each other. As shown in FIG. 14, for example, terrestrial digital television broadcasting enables broadcasting one or plural logical channels (services or programs) using a single transmitting channel.

Then, a receiver for terrestrial digital television broadcasting has a data table referred to as "channel list" or "preset table" to facilitate the selection of logical channels. Data for receiving logical channels (hereinafter, referred to as "channel data") is registered on the data table. In this case, the channel data is formed of data for selecting and setting transmitting channels and data for designating one of plural logical channels broadcasted by the transmitting channel.

Depressing any of numeric keys provided on the transmitter of a remote controller takes channel data corresponding to the depressed numeric key out of the channel list. The channel data is set in a tuner circuit and TS decoder circuit to select the logical channel of a corresponding transmitting channel. Thus, the receiver for terrestrial digital television broadcasting can select a logical channel using a preset selection function. Incidentally, "logical channel" is simply referred to as "channel" in the following description.

The following are documents describing related art.

[Patent document 1] Japanese Unexamined Patent Application Publication No. 1996-237570

[Patent document 2] Japanese Unexamined Patent Application Publication No. 2004-336093

SUMMARY OF THE INVENTION

As described above, however, for the case where broadcast is delivered using the MFN, a receiver mounted on a vehicle can move from a broadcast service area A to a broadcast service area B as the vehicle travels and fails to receive a channel which has been received so far.

For this reason, a user has to renew registered contents of a channel list after moved from the broadcast service area A to the broadcast service area B, however, it takes several minutes to scan all transmitting channels and renew the channel list. In addition, when the user returns to the original broadcast service area A from the broadcast service area B, the user has to renew the channel list, though the broadcast area A is an original area for reception.

FIG. 15 shows the distribution of transmitting stations (broadcast antennas) of terrestrial digital television broadcasting in London and its environs. Nine transmitting stations are set up in the area within about 80-km radius from the center of London. In other words, broadcast service areas covered by the transmitting stations are not so wide.

When a vehicle moves in London and its environs, broadcast service areas frequently change to fail to continuously receive the channel which has been received so far. For this reason, scanning is performed to renew the channel list each time a broadcast service area changes, which is not user-friendly.

As shown in FIGS. 16A and 16B, for example, when a vehicle has moved from the broadcast service area A to the broadcast service area B, the channel data obtained in the broadcast service area A in FIG. 16A is left in the channel list on which the channel data obtained in the broadcast service area B is additionally registered as shown in FIG. 16B. This eliminates the need for registering and renewing the channel data of broadcast service areas where a user has ever passed.

However, the number of channels in one broadcast service area generally totals up to 20 to 30, so that additionally registering channels of several broadcast service areas on a channel list significantly increases the number of channels. For example, if channels in broadcast service areas in London and its environs as shown in FIG. 15 are registered, the number of channels reaches about 250 to 300 in all. This makes it very difficult to zap programs (or to search a desired program while selecting channels).

Furthermore, in London and its environs shown in FIG. 15, for example, a channel "BBC ONE" can be received in any broadcast service area therein. If channels registered on a channel list are sorted, as shown in FIG. 17, nine "BBC ONEs" appear in series corresponding to the number of broadcast service areas. A user therefore cannot identify the channel which can be currently received at a place where the user is. Actually, the number of channels to be displayed at a time is limited to about eight and generally the channel number is not displayed. For this reason, it is very troublesome to select a desired channel.

If as many as 250 to 300 channels are registered on a channel list, and even if a desired channel is determined, display has to be scrolled. Even if the desired channel name is displayed, a plurality of the same channel names is often displayed, so that an attempt has to be made to sequentially receive the same channel names from the end of the display, which does not easy to use.

According to the present invention that addresses the aforementioned problem, it is desirable to provide a receiver for terrestrial digital television broadcasting capable of more easily selecting a channel.

A receiver for terrestrial digital television broadcasting according to an embodiment of the present invention includes a receiving circuit for receiving terrestrial digital television broadcasting to output a video signal and an audio signal of a predetermined channel and an information signal of information related to a channel being received;

a data table in the receiving circuit on which channel data for selecting channels of the terrestrial digital television broadcasting is registered; and a control circuit.

The control circuit is configured such that first data for identifying a channel, second data for identifying a broadcast service area and third data for identifying a transport stream are taken out of the information signal to be supplied to the control circuit, if the first data is normally obtained, the receiving circuit selects a channel based on the first data with reference to the data table, and if the first data is not normally obtained, the receiving circuit selects a channel based on the second and the third data with reference to the data table.

According to the embodiment of the present invention, selecting a channel using an LCN enables a user to continuously receive the same channel even if the user moves from one broadcast service area to another. Furthermore, even if a channel with the same channel name is registered on a channel list, the channel name of a channel which can be received in the current broadcast service area is displayed to facilitate selecting a desired channel.

An original network identifier and a transport stream identifier are used to identify a channel, facilitating selecting a channel even if broadcast does not use an LCN.

BRIEF DESCRIPTION OF THE DRAWINGS

Embodiments of the present invention will be described in detail based on the following figures, wherein:

FIG. 1 is a table describing an embodiment of the present invention;

FIG. 2 is a table describing an embodiment of the present invention;

FIG. 3 is a table describing an embodiment of the present invention;

FIG. 4 is a data list describing an embodiment of the present invention;

FIGS. 5A and 5B are data lists describing an embodiment of the present invention;

FIGS. 6A and 6B are charts describing an embodiment of the present invention;

FIGS. 7A and 7B are charts describing an embodiment of the present invention;

FIGS. 8A to 8C are charts describing an embodiment of the present invention;

FIG. 9 is a schematic diagram illustrating an embodiment of the present invention;

FIG. 12 is a data list describing an embodiment of the present invention;

FIG. 13 is a data list describing an embodiment of the present invention;

FIG. 14 is a chart describing a channel;

FIGS. 16A and 16B are charts describing a channel list; and

FIG. 17 is a chart describing a channel list.

DETAILED DESCRIPTION OF THE PREFERRED EMBODIMENT

Figure 10:
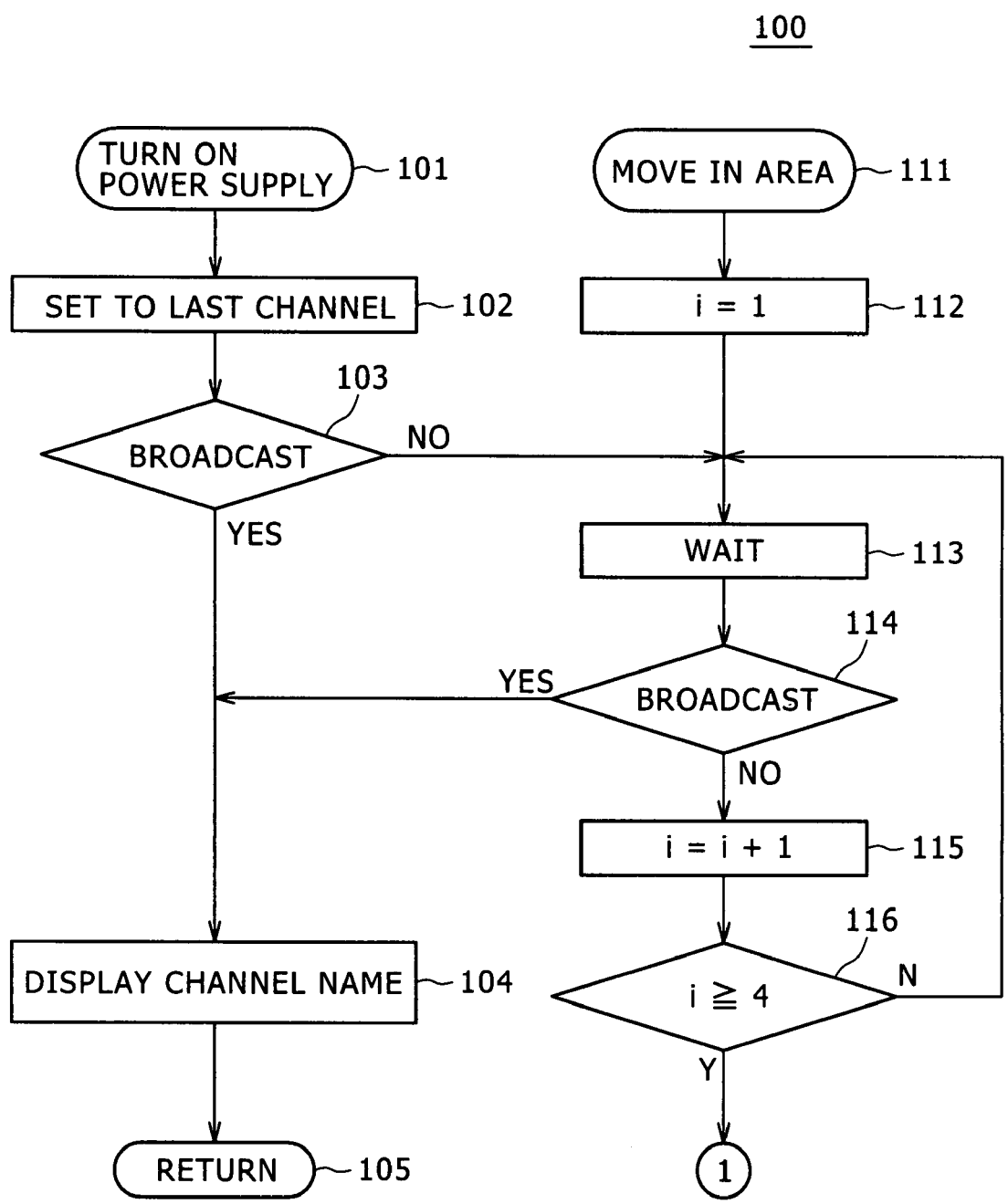
FIG. 10 is a flowchart illustrating an embodiment of the present invention.

[1] Information (Data) Used in the Embodiment of the Present

The terrestrial digital television broadcasting transmits a video signal, audio signal or data signal and at the same time various information signals as well. The following describes contents and functions of the information signals usable in the embodiment of the present among the various information signals. Related matters are also described.

[1-1] Logical Channel Number (LCN)

The LCN is data for identifying a channel (logical channel and service) and has such values as shown in FIG. 1. In other words, the LCN is 10 bits long and can use values 10 to 1023, however,

(11) the LCN is allocated to all channels;
(12) the values 001 to 799 out of the LCNs are uniquely allocated to a plurality of channels;
(13) the values 001 to 799 out of the LCNs are the same value in the same channel (the same service) even if broadcast service areas are different from each other;
(14) the values 800 to 999 out of the LCNs can be used at discretion on a receiver side; and
(15) the values 000 and 1000 or more out of the LCNs are not used.

Using the LCN enables determining whether a channel is the same or not. That is to say, when a user has moved from one broadcast service area to another, selecting the channel which is the same in the LCN as the channel which the user has received allows the user to continuously view and listen to the same channel (service and program).

The LCN is specified by standard for terrestrial digital television broadcasting (DVB-T). The allocation of the values of the LCN is specified by standard of each country.

[1-2] Information Usable Instead of the LCN

In UK the LCN has such contents as described in [1-1]. For this reason, using the LCN in UK makes it easy to select a channel and produce a channel list. In Spain, on the other hand, none of the values of the LCN has been used or specified, so that the LCN is dummy data. In Germany, the LCN in itself has not been transmitted. Determining a channel only from the LCN leads to malfunction from a user's standpoint depending on receiving locations.

Information referred to as Service Information Table (SIT) is included in an information signal transmitted in terrestrial digital television broadcasting. The SIT includes a table referred to as Service Description Table (SDT). A Linkage Descriptor Syntax in the SDT includes the following identifiers, as shown in FIG. 2, referred to as:

(21) "original network ID" and
(22) "transport stream ID."

The original network identifier is 16 bits long and a unique data for identifying broadcast service areas. The transport stream identifier is 16 bits long and unique data for identifying a transport stream.

For this reason, these identifiers can be used for determining broadcast service areas and transmitting channels when a channel list is produced. In other words, if a regular LCN is not obtained, it can be replaced with these identifiers.

[1-3] Information Usable for Improvement in the Display of a Channel List

Furthermore, information shown in FIG. 3 is included in a part of the SIT transmitted in terrestrial digital television broadcasting. Using the information of;

(31) Network Name;
(32) Service Provider Name; and
(33) Service Name enables determining transmitting stations (transmitting locations) and broadcast service areas thereof.

[1-4] Other Descriptors and Identifiers

Using the following descriptors and identifiers ensures determination using [1-2]:

(41) Terrestrial delivery system descriptor
(42) Frequency list descriptor
(43) Service list descriptor
(44) Network name descriptor
(45) Multilingual network name descriptor
(46) Linkage descriptor
(47) Event descriptor
(48) Network ID and
(49) Service ID.

These are obtained along with the LCN, original network identifier and transport stream identifier described in [1-1] and [1-2] and the AND operation thereof is executed to use these descriptors and identifiers.

The descriptors and identifiers are included in SIT. Detailed description thereof is omitted.

[1-5] Channel Selection Time

The above data needs to be checked each time transmitting channel (physical channel) or logical channel (service) are changed over, so that those data pieces need to be stored for each channel.

However, it takes much time to switch a transmitting channel or a logical channel if all the data is checked, which is not realistic. This requires some device.

[2] Outline of the Present Invention

[2-1] Contents of Channel List

Since a channel is selected using the information of [1], the data table shown in FIG. 4, for example, may be used as a channel list.

That is, the LCN, channel name, original network identifier, transport stream identifier and channel data form one group in this channel list. Each receivable channel has the group. Incidentally, the LCN, channel name and channel data have been described above. In addition, the original network identifier and transport stream identifier have been also described in [1-2].

[2-2] Registration on Channel List

A user scans the frequencies of terrestrial digital television broadcasting, for example, in an area where the user lives to register receivable channels (service) in the area on a channel list. The scan may be started and executed by pressing a manual button or by automatic control according to prescribed conditions.

FIG. 5A shows the result of scan in the broadcast service area A in London. A channel list is formed for receivable channels in the broadcast service area A. In FIG. 5A, the channel names are registered in order of LCNs.

As described in FIG. 4, the channel list includes the original network identifier, transport stream identifier and channel data, however, for the sake of simplicity, the illustration and description thereof are omitted from FIG. 5 and the following figures.

[2-3] Additional Registration on Channel List

If a user moves to another area, for example, to the broadcast service area B, the channels registered in the broadcast service area A cannot be received. Then, as is the case with [2-2], the user again scans frequencies to additionally register the LCNs and channel names of the channels receivable in the broadcast service area B on the channel list as shown in FIG. 5B for example. In this case, the LCNs and channel names of the channels receivable in the broadcast service area B may be duplicated.

In FIG. 5B and the following figures, the cells of the LCNs and channel names of the channels receivable in the broadcast service area B are shaded to discriminate between the LCNs and channel names of the channels receivable in the broadcast service areas A and B.

After that, if need be, the LCNs and channel names of the channels receivable in other broadcast service areas are additionally registered on the channel list.

As is apparent from the following description, since data can be additionally registered at any time, hereinafter, for the sake of simplification, data only in broadcast service areas A and B is presumed to be registered on the channel list and the contents of the channel list are presumed to be the same as those in FIG. 5B.

[2-4] Sorting Channel List

After registration on the channel list has been finished, the registered contents are sorted in order of the LCNs as shown in FIG. 6A. In this case, there are channels whose LCNs and channel names are duplicated in the broadcast service areas A and B. Sorting them in order of the LCNs causes the same LCNs and channel names in the broadcast service areas A (not shaded) and B (shaded) to continue and intermingle with each other as shown in FIG. 6A.

[2-5] Display of Menu of Channel List

The contents of the channel list sorted in the above [2-4] are displayed on a display in order of the LCNs in a menu format shown in FIG. 6B. In this case, if there is a plurality of the same LCNs in the list, such as, for example, LCN=001, one of them is displayed as a representative. In other words, the LCN and channel name are displayed at a rate of one per LCN. Incidentally, although the original network identifier, transport stream identifier and channel data shown in FIG. 4 are included in the channel list, they are not displayed. FIG. 6B is a main menu.

[2-6] Display of Sub-Menu (1)

Even if the LCNs are displayed one by one as shown in FIG. 6B, a plurality of broadcast service areas may correspond to one LCN as shown in FIG. 6A. In this case, the broadcast service areas A and B correspond to one LCN.

(1) The transmitting location (transmitting station) of the broadcast service area A is taken to be North-East and (2) the transmitting location of the broadcast service area B is taken to be Wales, hereinafter.

Moving a cursor to LCN=001, for example, in the main menu shown in FIG. 6B displays a sub-menu related to or connected to the line of LCN=001 as shown in FIG. 7A. The sub-menu displays the names of transmitting locations where the channel of LCN=001 can be received.

In FIG. 7A, LCN=001 or the transmitting locations of the channel name "BBC ONE" indicate "North-East" and "Wales." Incidentally, the names of transmitting locations can be obtained from information shown in [1-3].

Selecting "North-East," for example, out of LCN=001 as a transmitting location displays "North-East" being the name of a transmitting location selected on the upper portion of the main menu as shown in FIG. 7B. The main menu displays the channel name (and LCN) of the channel receivable in the broadcast service area corresponding to the transmitting location "North-East". However, the channel name (and LCN) of the channel receivable in the broadcast service area corresponding to the transmitting location "Wales" is not displayed.

Even when other channels are selected thereafter, the channel in the broadcast service area corresponding to the transmitting location "North-East" can be selected, thereby the channel can be surely received.

[2-6] Display of Sub-Menu (2)

FIG. 8A corresponds to FIG. 6A and shows a channel list on which the LCNs and channel names of four broadcast service areas A to D are registered. Also, in this case, if there is a plurality of the same LCNs in the list, the LCNs and channel names of one of them are displayed as a representative as shown in FIG. 8B.

Moving a cursor to LCN=001, for example, in the main menu shown in FIG. 8B displays a sub-menu related to or connected to the line of LCN=001 as shown in FIG. 8C. The sub-menu displays channel numbers with which the channel of LCN=001 can be received.

For this reason, a channel can be selected from those in the sub-menu. The main menu is renewed to that corresponding to the channels receivable in broadcast service areas corresponding to the channel. As a result, even when other channels are selected, the channel can be surely received.

[2-7] Moving One Broadcast Service Area to Another

When a user moves, for example, from the broadcast service area A to another, the user cannot receive the channel in the broadcast service area A as it is. When such a state is detected, it is determined that a user has moved from the broadcast service area A to another and determination is made as to whether other channels with the same LCN can be received.

[2-7-1] Moving to Known Broadcast Service Area

As a result of determination in [2-7], if the user has moved from the broadcast service area A to the known broadcast service area, for example, to the broadcast service area B, the channel with the same LCN in the broadcast service area B has been registered on the channel list. Then, the channel with the same LCN in the broadcast service area B is selected and continuously received.

[2-7-2] Moving to Unknown Broadcast Service Area

As a result of determination in [2-7], if the user has moved from the broadcast service area A to an unknown broadcast service area, for example, to the broadcast service area C, channels receivable in the broadcast service area C have not been registered on the channel list. Accordingly, the channel with the same LCN cannot be received.

Then, in this case, the LCNs and channel names receivable in the broadcast service area C are additionally registered on the channel list according to [2-2] and [2-3]. Thereafter, executing sorting in [2-4] and the following to select and receive a channel with the same LCN in the broadcast service area C.

[3] Configuration

FIG. 9 is one example of a receiver for terrestrial digital television broadcasting to which an embodiment of the present invention is applied and shows a receiving circuit 10. In the receiving circuit 10, a broadcast wave of terrestrial digital television broadcasting is received by the antenna 11. The received signal including a desired channel (logical channel) is supplied to a synthesizer tuner to be converted into an intermediate frequency signal.

The intermediate frequency signal is supplied to a demodulating circuit 14 through an intermediate frequency circuit 13. The demodulating circuit 14 outputs a demodulated MPEG2 transport stream to be supplied to a TS decoder circuit 15 to select data stream of video and audio of a desired channel and output a decoded stream.

The output video data stream is supplied to a video decoder circuit 16 to be decoded to an original digital video signal. The digital video signal is supplied to a display device of digital input, for example, to an LCD panel 18 through an OSD circuit 17 to display video of a desired channel.

The OSD circuit 17 serves to control the supply of a video signal from the video decoder circuit 16 to the LCD panel 18 according to the control signal from a system control circuit 30 described later. The OSD circuit 17 further serves to form digital video signals for displaying predetermined characters (including numerals and marks) according to display data from a system control circuit 30 to supply them to the LCD panel 18. A main menu is displayed according to display data to be supplied to the OSD circuit 17.

Audio data stream output from the TS decoder circuit 15 is supplied to an audio decoder circuit 21 to be decoded to an original digital audio signal and to be converted to an analog signal. This signal is supplied to a loudspeaker 22 to output voice corresponding to the video signal displayed on the LCD panel 18.

The TS decoder circuit 15 outputs the aforementioned information signal to be supplied to a system control circuit 30. At the same time the demodulating circuit 14 and TS decoder circuit 15 supply status signals to the system control circuit 30. In addition, the system control circuit 30 supplies a channel selection signal to the tuner circuit 12, in which a physical channel including a desired logical channel is frequency-converted. The system control circuit 30 also supplies a control signal to the TS decoder circuit 15 to select and decode the desired logical channel.

The system control circuit 30 serves to control channels received by the receiving circuit 10 and the display of the LCD panel 18. The system control circuit 30 is formed by a micro computer and includes a CPU 31, a ROM 32 in which various programs are written, a RAM 33 for a work area and a non-volatile memory 34.

Figure 11:
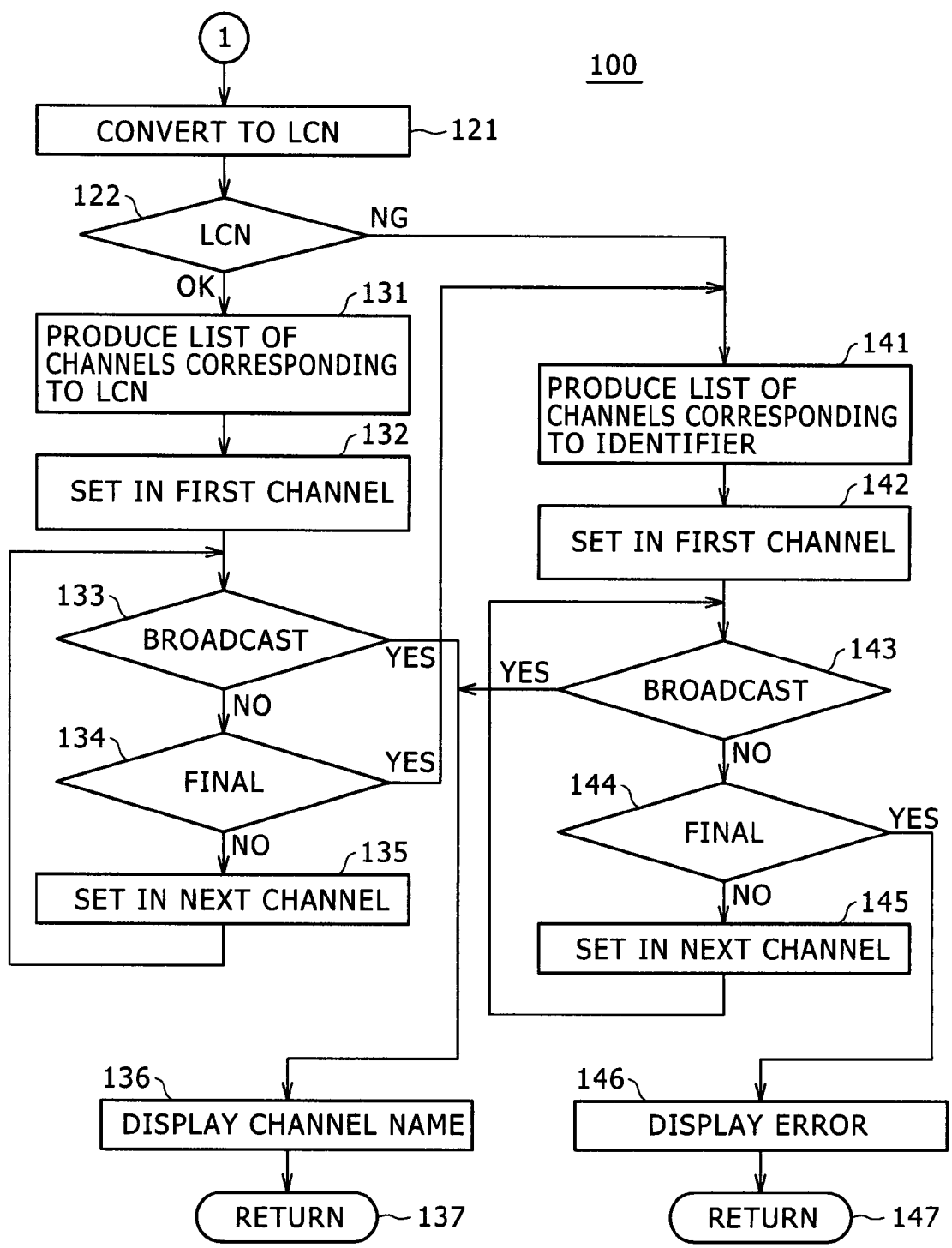
FIG. 11 is a flowchart illustrating an embodiment of the present invention.
Figure 15:
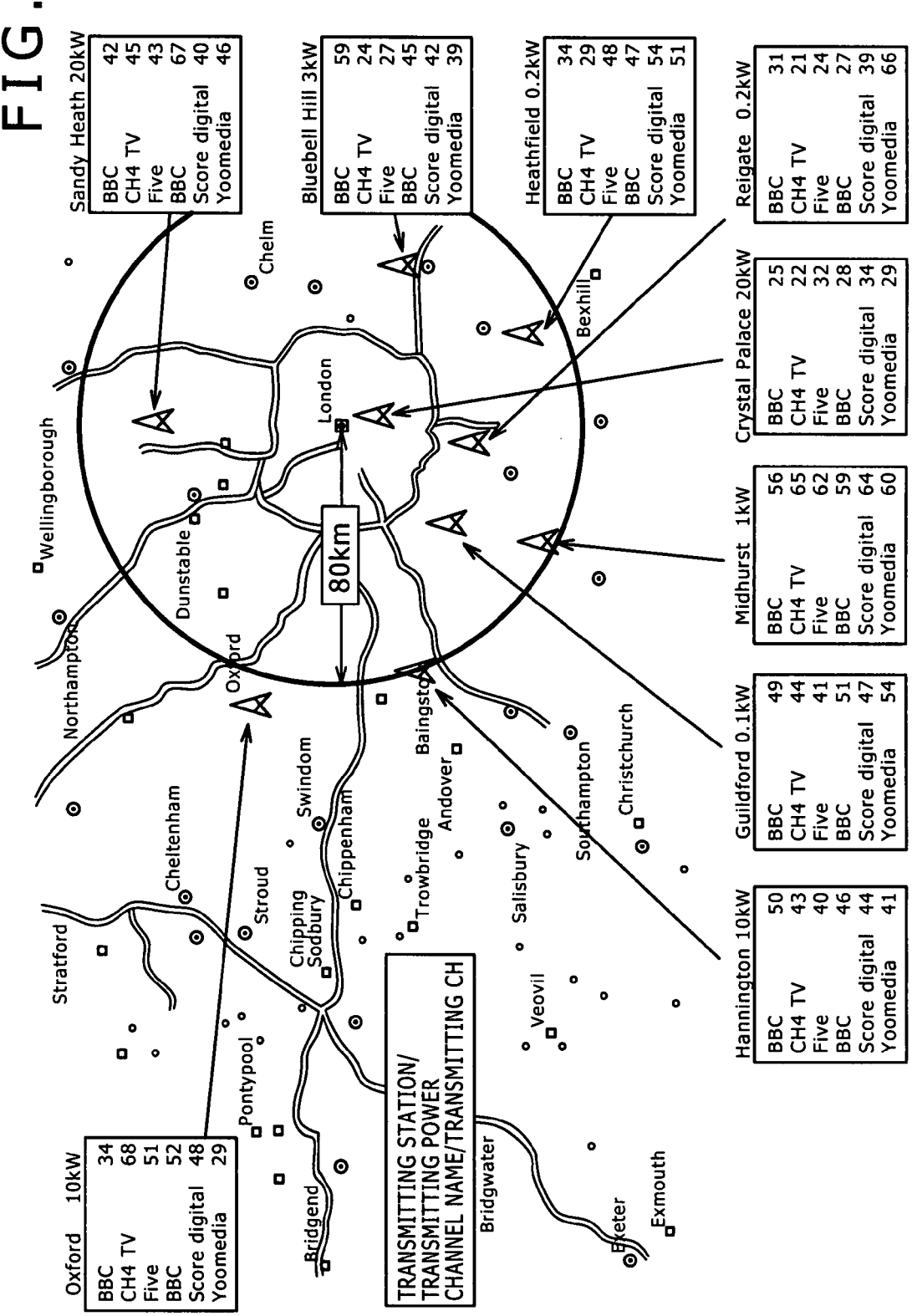
FIG. 15 is a chart describing a broadcast service area.

The ROM 32 includes a routine 100 as a part of the programs, for example, as shown in FIGS. 10 and 11. The routine 100 serves to select a channel and is described in detail later. The routine 100 in FIGS. 10 and 11 illustrates only a part related to an embodiment of the present invention. The memory 34 includes a channel list shown in FIG. 4, for example and an area for saving data for receiving a last channel (or a channel received when a power supply has been turned off).

Various operation keys 41 and a receiving unit 42 for a remote controller are connected to the system control circuit 30. The receiving unit 42 is paired with a transmitter 50 for the remote controller. The transmitter 50 and the receiving unit 42 realize the remote controller using infrared rays. The transmitter 50 has "1" to "10" numeric keys 51 as a part of the operation keys. The numeric keys 51 also serve to realize preset channel selection function described later.

[4] Operation

[4-1] Turning on Power Supply

Turning on the power supply of the receiver causes the process of the CPU 31 in the system control circuit 30 to start a step 101 of the routine 100. At step 102, the channel data of the last channel is read from the memory 34 to be set in the tuner circuit 12 and TS decoder circuit 15.

Thus, the tuner circuit 12 selects a physical channel including a desired logical channel based on the channel selection signal out of channel data in the last channel. The TS decoder circuit 15 selects and decodes a desired logical channel based on the control signal out of channel data of the last channel.

Subsequently, at step 103, a status signal, for example, from the TS decoder circuit 15 is checked to determine as to whether broadcast can be received by the channel set at step 102.

In this case, if the power supply is turned on in the same broadcast service area where the power supply was turned off last time, the receiver operates so as to receive the channel (last channel) which was received when the power supply was turned off.

For this reason, the process advances from step 103 to step 104. A predetermined digital video signal is formed by the OSD circuit 17 according to the control of the system control circuit 30 and supplied to the LCD panel 18 to display the channel name for a predetermined period. After that, the routine 100 is terminated at step 105. Consequently, this case means that the channel received when the power supply was turned off last time can be received.

Even if the power supply is turned on in the same broadcast service area where that was turned off last time, the channel which was received when the power supply was turned off last time cannot be received when the power supply is turned on in an area where the radio field strength is weak such as a basement parking area or a tunnel or the power supply is turned on after a user has moved to another broadcast service. This case will be described in the following [4-2].

[4-2] Interruption and Continuation of Reception

When a receiver moves to another broadcast service area while receiving a channel, the channel which has been received so far cannot be received any longer. A status signal from the TS decoder circuit 15 notifies the system control circuit 30 of this status. Then, the process of the CPU 31 causes the routine 100 to start at step 111 and at step 112 a loop counter i is set to "1" to wait for a predetermined period of time at step 113.

At step 114, the status signal from the TS decoder circuit 15 is checked to determine as to whether the channel received until then can be received. If the channel received until then cannot be received, the process proceeds from step 114 to step 115. The loop counter i is incremented by "1" and, thereafter, at step 116 determination is made as to whether the loop counter reaches the upper limit of four or more in FIG. 10. If the loop counter i is less than four, the process returns from step 116 to step 113. Thus, wait at step 113 and reception and conformation of channel at step 115 are repeated.

If the channel received until then can be received at step 114, the process advances from step 114 to step 104. The routine 100 is terminated at step 105. For this reason, if the channel received until then cannot be received temporarily because a vehicle goes into a tunnel or moves behind a building, the channel received until then is continuously received.

If the channel received when the power supply was turned off last time cannot be received at step 103, the process advances from step 103 to step 113, and wait at step 113 and reception and conformation of channel at step 115 are repeated.

If the channel received when the power supply was turned off last time can be received, the process advances from step 114 to step 104, and the channel received when the power supply was turned off last time is continuously received. However, when a receiver moves to another broadcast service area, the channel received until then (or the channel received when the power supply was turned off last time) cannot be continuously received, and the number of repetitions between steps 113 to 116 exceeds the upper value of four in FIG. 10, which is determined in step 116 and the process proceeds from step 116 to step 121 where the processes described in [4-3] and [4-4] are performed.

[4-3] LCN Available

As described above, the LCN is correctly transmitted in UK. Using the channel list (refer to FIG. 4) enables the channel name of a received channel to be converted into the LCN. However, in Spain and Germany, the LCN is not correctly transmitted, so that the channel name cannot be converted into the LCN.

When a vehicle moves from one broadcast service area to another, firstly determination is made as to whether the LCN is transmitted. If the LCN is transmitted, the following reception process is executed, and if not, the reception process in [4-4] is conducted.

In other words, if the channel received until then cannot be received, the process advances from step 116 to step 121. At step 121, a channel list is referred to execute the process for converting the channel name of a desired channel into an LCN.

In the next place, at step 122, determination is made whether a conversion process is normally executed at step 121. If the channel name is normally converted into an LCN, the process advances from step 122 to step 131 and a list shown in FIG. 12, for example, is produced at step 131. Hereinafter, the list is referred to as "LCN list."

That is, for example, a channel list is presumed to include the contents shown in FIG. 5B (including also an original network identifier, transport stream identifier and code as is the case with FIG. 4) and the channel "BBC ONE" with an LCN=001 is presumed to have been received until then in the broadcast service area A.

At step 131, groups of the channel names and channel data with an LCN=001 are taken out of the channel list (FIG. 5) as shown in FIG. 12. In this case, two groups are taken out to be compiled into an LCN list. In other words, all the groups of the LCNs having the same in value as the LCNs converted at step 121 in the channel list (FIG. 5B) and the groups of the channel names and channels data forming the groups with the LCNs are taken to be registered on the LCN list.

At step 132, the channel data of a first group in the LCN list (for example, FIG. 12) is taken out to be set in the tuner circuit 12 and TS decoder circuit 15. Next, at step 133, the status signal from the TS decoder circuit 15 is checked to determine whether the channel received until then can be received.

If the channel cannot be received, the process advances from step 133 to step 134. At step 134, determination is made whether all the groups including the final group in the LCN list (for example, FIG. 12) are subjected to determination on reception at steps 132 and 133. If all the groups including the final group are not subjected to determination on reception, the process proceeds from step 134 to step 135. At step 135, the channel data of the next group is taken out to be set in the tuner circuit 12 and TS decoder circuit 15. Thereafter, the process returns to step 133.

According to steps 133 to 135, the channel data registered on the LCN list is sequentially set in the tuner circuit 12 and TS decoder circuit 15 and determination is sequentially made whether the same channel as received until then can be received. In other words, this means that a broadcast service area where the same channel as received until then can be received is searched.

If the same channel can be received in a certain channel data to be searched, this is determined at step 133. The process advances from step 133 to step 136 and, hereinafter, the channel shown by the channel data is continuously received. At step 136, data of the channel name forming a group with the channel data at that point is taken out of the LCN list to be supplied to the OSD circuit 17 and the channel name at that point is displayed on the LVD panel 18 for a predetermined period. After that, the routine 100 is terminated at step 137.

Even if the channel received until then cannot be received because a vehicle has moved from one broadcast service area to another, the channel can be continuously received as long as the channel with the same LCN is broadcasted.

[4-4] LCN Unavailable

At step 122, if it is determined that the channel name is not normally converted into an LCN, the process advances from step 122 to step 141. In addition, if the same channel cannot be received though all the groups including the final group in the LCN list (for example, FIG. 12) are subjected to determination on reception at steps 132 and 133, the process advances from step 134 to step 141.

At step 141, a list shown in FIG. 13, for example, is formed. Hereinafter, the list is referred to as "identifier list."

That is, if the channel list is presumed to include the contents (however, LCNs are taken to be unknown) shown in FIG. 4, for example, and the channel "BBC ONE" in the first line is presumed to be received, the channel has an original network identifier=OO . . . (A) and
a transport stream identifier=XX . . . (B), so that all the groups of the channel names and channel data with identifiers equal to the above identifiers (A) and (B) as shown in FIG. 13 are taken out at step 141 to be compiled as the identifier list. That is, all the channel data with the same original network identifier and transport stream identifier as the channel received until then and groups with the channel data are taken out of the channel list (FIG. 4) to be registered on the identifier list.

At step 142, the first group of channel data in the identifier list (for example, FIG. 13) is taken out to be set in the tuner circuit 12 and TS decoder circuit 15. At step 143, the status signal from the TS decoder circuit 15 is checked to determine whether the same channel as received until then can be received.

If not, the process advances from step 143 to step 144. At step 144, determination is made whether all the groups including the final group in the identifier list (for example, FIG. 13) are subjected to determination on reception at steps 142 and 143. If all the groups including the final group are not subjected to determination on reception, the process proceeds from step 144 to step 145. At step 145, the channel data of the next group is taken out to be set in the tuner circuit 12 and TS decoder circuit 15. Thereafter, the process returns to step 143.

According to steps 143 to 145, therefore, the channel data registered on the identifier list is sequentially set in the tuner circuit 12 and TS decoder circuit 15 and determination is sequentially made whether the same channel as received until then can be received. In other words, this means that a broadcast service area where the same channel as received until then can be received is searched.

If the same channel can be received in a certain channel data to be searched, this is determined at step 143. The process advances from step 143 to step 136 and, hereinafter, the channel shown by the channel data is continuously received and the routine 100 is terminated at step 137.

Consequently, even if a vehicle moves to a broadcast service area where an LCN is not transmitted, the channel can be continuously received as long as the same channel is broadcasted.

[4-5] Supplement

If the same channel cannot be received though all the groups including the final group are subjected to determination on reception at steps 142 and 143 in the identifier list (for example, FIG. 13), the process proceeds from step 144 to step 146. At step 146, a predetermined display data is supplied to the OSD circuit 17 and the LCD panel 18 displays a failure in reception of the same channel. After that, the routine 100 is terminated at step 147.

[5] Selection of Channel Using Channel List

A numeric key to which a desired channel is preset is pressed in the numeric keys 51 of the remote controller transmitter 50.

Pressing, for example, a key "3" in the numeric keys 51 transmits infrared rays from the transmitter 50 to the receiver 42 to notify the system control circuit 30 that the key "3" has been pressed. Then, the system control circuit 30 takes channel data out of the group of the key "3" in the channel list and supplies it to the tuner circuit 12 and TS decoder circuit 15.

Accordingly, the LCD panel 18 displays the video signal of the channel preset to the key "3." The loudspeaker 22 outputs audio sound of the channel preset to the key "3."

Furthermore, at this point, data of channel name is taken out of the group of the key "3" in the channel list to be supplied to the OSD circuit 17 as display data. As a result, the channel name of the channel preset on the key "3" is superposed on a broadcast video signal and displayed on the LCD panel 18 for a predetermined period.

Pressing any of "1" to "10" of the keys 51 selects a channel preset to the pressed key to enable the channel to be received.

[6] Conclusion

The foregoing television receiver is adapted to select a channel using the LCN when moving to another broadcast service area, so that the receiver is capable of continuously receiving the same channel when moving to another broadcast service area. Furthermore, the channel list does not need to be renewed after the receiver has moved to another broadcast service area. Even if a channel with the same channel name is registered on a channel list, the channel name of a channel receivable in the present broadcast service area is displayed, facilitating selection of a desired channel.

The receiver identifies channels using the original network identifier and transport stream identifier, so that it easily selects a channel without the LCN in Spain and Germany for example.

Although the above is cited as an example where terrestrial digital television broadcasting is received by an on-vehicle receiver, an embodiment of the present invention is applicable to a receiver mounted on other moving objects or a mobile receiver such as a receiver incorporated in a notebook personal computer or a cellular phone.

The values of the LCN are used not only in DVB-T but in all digital broadcasts in each country, therefore an embodiment of the present invention is applicable not only to DVB (European system) but to ISDB-T (Japanese system) and ATSC (US system).

For example, for a receiver in a car audio system, the routine 100 may be automatically executed at the back while a television broadcast is not being received, that is, while a cassette tape or a CD is being played or a navigation device is being operated.

After a failure in reception of the same channel is displayed at step 146, the process is caused to be in a state of wait for instructions from a user and may repeat the step 122 and the following steps when the user instructs the process to renew. Alternatively, the steps may be automatically repeated without the user's instructions, and scanning may be repeated until the number of repetitions thereof or the total time period of repetitions reaches a predetermined value.

A flag may be provided on a channel list instead of the LCN list or the identifier list to perform the same process as in the LCN list or the identifier list by setting and resetting the flag.

It should be understood by those skilled in the art that various modifications, combinations, sub-combinations and alternations may occur depending on design requirements and other factors insofar as they are within the scope of the appended claims or the equivalents thereof.

ABBREVIATION LIST

ATSC: Advanced Television System Committee
BBC: The British Broadcasting Corporation CPU: Central Processing Unit
D/A: Digital to Analog
DVB: Digital Video Broadcasting
DVB-T: Digital Video Broadcasting-Terrestrial
ID: IDentification
ISD-T: Integrated Services Digital Broadcasting-Terrestrial
LCD: Liquid Crystal Display
LCN: Logical Channel Number
MFN: Multi Frequency Network
MPEG: Motion Picture Experts Group
MPEG2: MPEG Phase 2
OSD: On Screen Display
RAM: Random Access Memory
ROM: Read Only Memory
SDT: Service Description Table
SIT: Service Information Table
TS: Transport Stream

What is claimed is:

1. A receiver for terrestrial digital television broadcasting comprising:
   a receiving circuit for receiving terrestrial digital television broadcasting to output a video signal and an audio signal of a predetermined channel and an information signal of information related to a channel being received;
   a data table in the receiving circuit on which channel data for selecting channels of the terrestrial digital television broadcasting is registered; and
   a control circuit configured such that:
   first data for identifying a channel, second data for identifying a broadcast service area and third data for identifying a transport stream are taken out of the information signal to be supplied to the control circuit,
   if the first data is normally obtained, the receiving circuit selects a channel based on the first data with reference to the data table, and
   if the first data is not normally obtained, the receiving circuit selects a channel based on the second and the third data with reference to the data table,
   wherein when a first channel is being received, the receiver moves to a new broadcast service area, a channel in the new broadcast service area is to be selected, and the first data is not normally obtained, the control circuit selects a channel in the new broadcast area by forming a list of groups having the same second data and third data as the first channel and selects a group for which an associated channel matches the first channel, and wherein when no group is associated with a channel that matches the first channel, the control circuit initiates display of a message indicating failure in reception of the same channel.

2. The receiver for terrestrial digital television broadcasting according to claim 1 further comprising a data table for the first, the second and the third data and for fourth data for selecting the channel in the receiving circuit, wherein at least any one of the first, the second and the third data is converted into the fourth data with reference to the data table to be supplied to the receiving circuit to select a corresponding channel.

3. The receiver for terrestrial digital television broadcasting according to claim 1,
   wherein the first data is an LCN which is a unique value for a plurality of channels irrespective of broadcast service areas,
   the second data is a unique original network identifier for identifying broadcast service areas and
   the third data a unique transport steam identifier for identifying transport streams.

4. A method of receiving terrestrial digital television broadcasting comprising the steps of:
   receiving at a receiver terrestrial digital television broadcasting to output a video signal and an audio signal of a predetermined channel and an information signal of information related to a channel being received;
   registering channel data for selecting channels of the terrestrial digital television broadcasting on a data table;
   taking first data for identifying a channel, second data for identifying a broadcast service area and third data for identifying a transport stream out of the information signal to be supplied;
   selecting a channel based on the first data with reference to the data table if the first data is normally obtained; and
   selecting a channel based on the second and the third data with reference to the data table if the first data is not normally obtained,
   wherein when a first channel is being received, the receiver moves to a new broadcast service area, a channel in the new broadcast service area is to be selected, and the first data is not normally obtained, a channel in the new broadcast area is selected by forming a list of groups having the same second data and third data as the first channel and selecting a group for which an associated channel matches the first channel, and wherein when no group is associated with a channel that matches the first channel, a message is displayed indicating failure in reception of the same channel.

5. The method of receiving terrestrial digital television broadcasting according to claim 4,
   wherein a data table for the first, the second and the third data and for fourth data for selecting the channel is included in the receiving circuit, and
   at least any one of the first, the second and the third data is converted into the fourth data with reference to the data table to select a channel corresponding to the fourth data.

6. The method of receiving terrestrial digital television broadcasting according to claim 4,
   wherein the first data is an LCN which is a unique value for a plurality of channels irrespective of broadcast service areas,
   the second data is a unique original network identifier for identifying broadcast service areas and
   the third data a unique transport steam identifier for identifying transport streams.

* * * * *